Sept. 5, 1961     T. J. WHITE     2,998,655
LEVELING SQUARE
Filed March 24, 1958
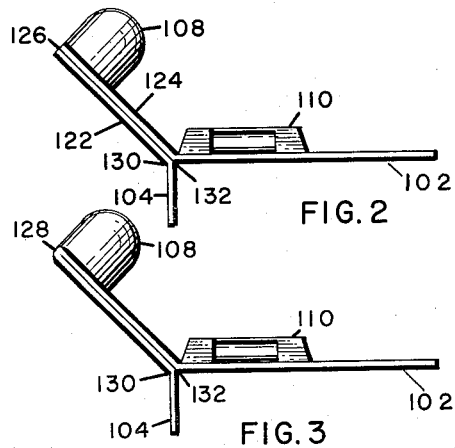
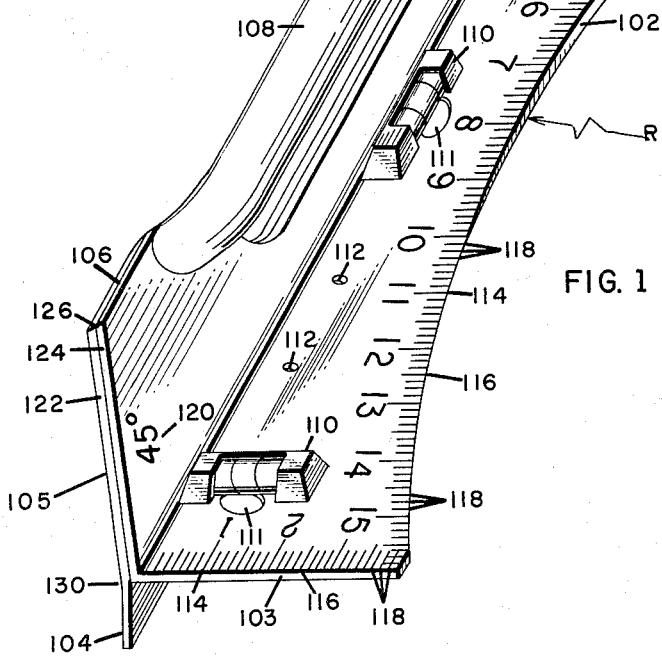
INVENTOR.
THOMAS J. WHITE
BY Walter G. Finch
ATTORNEY United States Patent Office 2,998,655
Patented Sept. 5, 1961

2,998,655
LEVELING SQUARE
Thomas J. White, 204 Hawthorne Road,
Linthicum Heights, Md.
Filed Mar. 24, 1958, Ser. No. 723,545
3 Claims. (Cl. 33—89)

This invention relates generally to geometrical instruments, and more particularly it pertains to a leveling square or equivalent arrangement.

In the trades, it is necessary to plumb and level structures having defined edges, such as door openings, outside corners of walls and cabinets and also cylindrical objects, such as pipes and poles. The occasion also arises that certain measurements need to be taken of structures or marked thereon.

It is an object of this invention to provide an instrument whereby structures as related above can be plumbed, leveled, and dimensioned with but one tool.

Furthermore, it is an object of this invention to provide a combined plumbing, leveling and measuring tool with a scale having obstacle clearance qualities.

Still another object of the invention is to provide a combined level, plumb, and scale which is easily and economically manufactured and efficient and reliable in operational use.

These and other objects and advantages of this invention will become more readily apparent and understood from the accompanying specification and single sheet of drawings in which:

FIG. 1 is a perspective view of a leveling square embodying features of this invention;

FIG. 2 is an end view of the leveling square of FIG. 1; and

FIG. 3 is an end view showing a modified form of the leveling square comprising this invention.

Referring now to FIGS. 1 and 2, reference numeral 100 refers in general to a leveling square which is one embodiment of the invention. Leveling square 100 is constructed of metal plates bent into a Y-like cross-section having a long central axis, a right angle corner 132, and an obtuse angle corner 130, as best seen in FIG. 2. This leveling square 100 has a plate 102, which is a first arm of the Y shape, a plate 104, which is a second arm, and, a plate 106 which is a third arm thereof.

The plate comprising the first arm 102 of the leveling square has a square end 101 and another square end 103 both referred to the axis of the Y.

The plate comprising the third arm 106 of the Y has ends 105 and 107 each cut off at forty-five degrees referred to the axis of the Y and has an embossed handle 108 with a finger clearance slot 109. The handle 108 is offset slightly from the plane of plate 106 of the Y to facilitate handling of the instrument.

The leveling square 100 is provided with three bubble levels 110. These bubble levels 110 are mounted on the plate comprising first arm 102 and are arranged to indicate either true level of the Y axis or true perpendicularity thereof.

Apertures 111 provide visibility of bubble levels 110 from both sides of plate 102.

Holes 112 are pierced in plate 102 for fastening extension fixtures to the leveling square 100, if desired. For example, it may be desired to mark or make measurements at a distance. Holes 112 can be utilized to attach the necessary fixtures to the leveling square 100 to accomplish this.

The three edges of plate 102 are numbered and line only marked for scales having inch graduations 114, half-inch graduations 116, and eighth-inch graduations 118.

In addition, the long scale as pictured is cut away on a large radius indicated by a broken arrow R. This long scale can be used to make measurements not readily accessible or for use in addition and subtraction of measurements.

Angle designation marks 120 are indicated adjacent to cut ends 105 and 107. These angles can readily be 30°, 45°, or 60° as desired.

As shown in FIGS. 1 and 2, the third arm 106 of the Y may be formed from extensions of plates comprising arms 102 and 104 formed by riveting or welding the two thicknesses together.

If a sharp edge 126 adjacent to handle 108 is undesirable, it may be better and more economical to form the entire instrument body from a single metal plate having a reverse bend 128 as shown in FIG. 3.

In operational use, the leveling square 100 is placed so as to rest the object to be plumbed or leveled in right angle corner 132 or obtuse angle corner 130. For leveling operations, the hanle is down.

For vertical plumbing operations, the leveling square 100 is held with either end 101 or 102 upwardly. While thus positioned against an object, both horizontal and vertical measurements may be made from the scales. Squaring off and 45 degree lines may also be drawn or checked.

The large cutaway radius R permits the longer scale of arm 102 to clear obstacles, such as door knobs or hinges with no interference to measuring or plumbing functions of the invention.

Obviously, many modifications and variations of the present invention are possible in light of the above teachings. It is, therefore, to be understood that within the scope of the appended claims, the invention may be practiced otherwise than as specifically described.

What is claimed is:

1. A leveling square arrangement, comprising, an elongated structure having three legs extending outwardly from the longitudinal axis thereof and angularly to each other and forming substantially plane surfaces, said legs of said structure being formed of a continuous piece of material, two of said legs of said structure being formed at 90° to each other, the other two angles between the legs of said structure being obtuse and substantially equal, said legs of said structure being of greater length than the width thereof, one of said two legs having at least two bubble levels mounted thereon and arranged at right angles to each other, with the outer edge thereof of said one leg being concave toward said longitudinal axis of said structure and having graduated scales along its edges thereof, the third leg of said structure having a longitudinally extending slot formed therein and a handle offset from said third leg, with said slot being located intermediate said handle and said longitudinal axis of said structure.

2. An arrangement as recited in claim 1, wherein the short edges of said third leg are formed at an angle to the longitudinal edge thereof.

3. An arrangement as recited in claim 1, wherein said leg with the bubble levels thereon is provided with apertures for viewing said bubble levels.

References Cited in the file of this patent
UNITED STATES PATENTS

| | | |
|---|---|---|
| 657,675 | Quimby | Sept. 11, 1900 |
| 1,160,920 | Lucas | Nov. 16, 1915 |
| 1,210,339 | Maddox | Dec. 26, 1916 |
| 2,214,408 | De V. Arizpe | Sept. 10, 1940 |

(Other references on following page)

UNITED STATES PATENTS

| | | | |
|---|---|---|---|
| 2,307,892 | Lowther | Jan. 12, | 1943 |
| 2,463,694 | Jenison | Mar. 8, | 1949 |
| 2,624,953 | Newcomb | Jan. 13, | 1953 |
| 2,635,350 | Bettega | Apr. 21, | 1953 |
| 2,679,715 | Heintz | June 1, | 1954 |
| 2,795,854 | Perkal | June 18, | 1957 |
| 2,906,031 | Rice | Sept. 29, | 1959 |

FOREIGN PATENTS

| | | | |
|---|---|---|---|
| 167,128 | Switzerland | Oct. 2, | 1913 |